A. D. EBERLY.
TROLLEY RETRIEVER.
APPLICATION FILED MAR. 13, 1916.
1,219,713.
Patented Mar. 20, 1917.
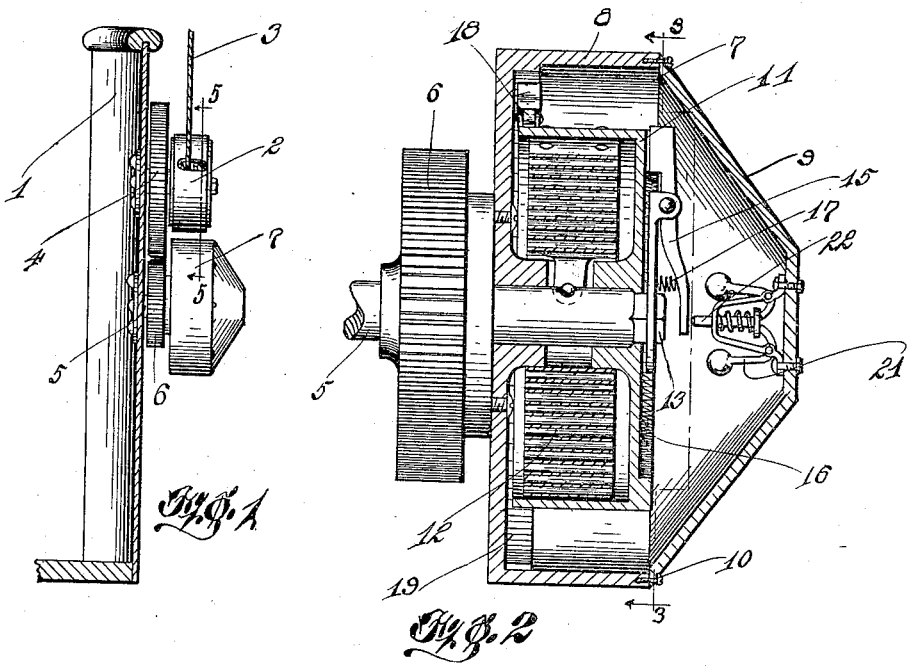
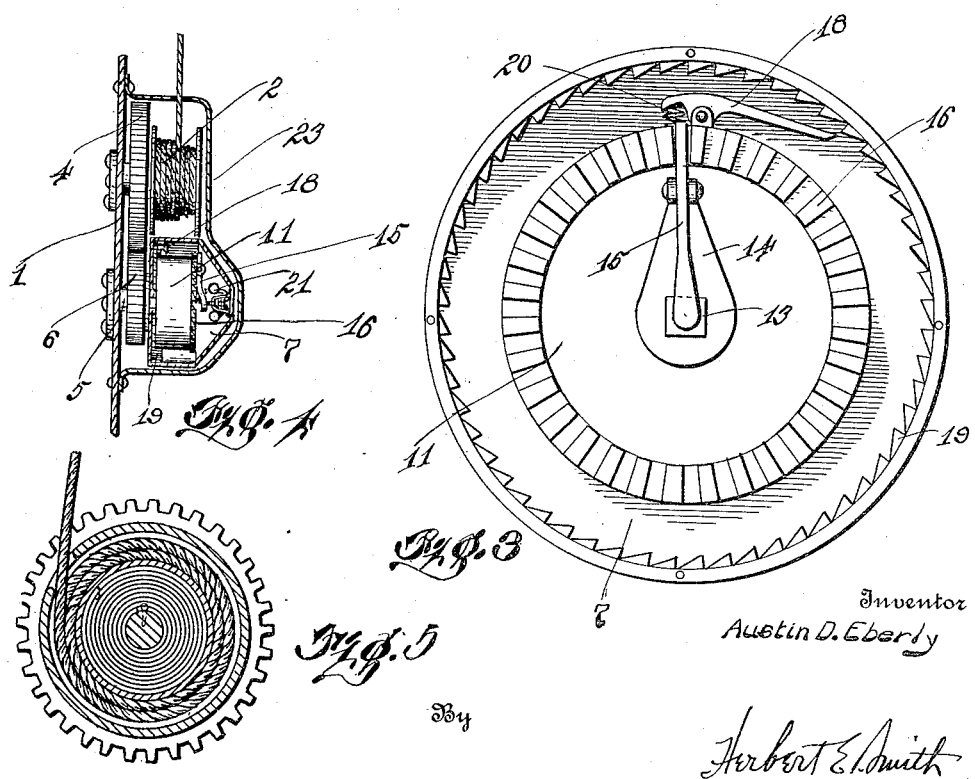
Inventor
Austin D. Eberly
By
Herbert E. Smith
Attorney

UNITED STATES PATENT OFFICE.

AUSTIN D. EBERLY, OF SPOKANE, WASHINGTON.

TROLLEY-RETRIEVER.

1,219,713.  Specification of Letters Patent.  Patented Mar. 20, 1917.

Application filed March 13, 1916. Serial No. 83,967.

*To all whom it may concern:*

Be it known that I, AUSTIN D. EBERLY, a citizen of the United States, residing at Spokane, in the county of Spokane and State of Washington, have invented certain new and useful Improvements in Trolley-Retrievers, of which the following is a specification.

This invention relates to new and useful improvements in trolley retrievers and more particularly to a device designed for attachment and operation in connection with the ordinary slack take up device for trolley ropes and the primary object of the invention is to provide a device which will prevent a trolley from causing damage when the same leaves the wire.

A further object of the invention is to provide a device which will draw the trolley poles sufficiently far downward to have it clear of the cross wires and thus prevent tearing them down.

Still another object resides in providing a device which is simple and durable in construction, inexpensive to manufacture and one which will be very efficient and useful in operation.

With these and other objects in view my invention consists in the novel features of construction, combination and arrangement of parts, as will be hereinafter referred to and more particularly pointed out in the specification and claims.

In the accompanying drawing forming a part of this application:—

Figure 1 is a side elevation of a device constructed in accordance with my invention and applied to use;

Fig. 2 is an enlarged vertical section therethrough;

Fig. 3 is a transverse section through the device as seen on the line 3—3 of Fig. 2; and Fig. 4 is a section through a slightly modified form of the invention.

Fig. 5 is a section through the spring take-up, as shown on line 5—5 of Fig. 1.

In describing the invention, I shall refer to the drawing in which similar reference characters designate corresponding parts throughout the several views and in which 1 designates the rear of a trolley car to which is applied the spring take-up device 2 utilized for taking up the slack in the trolley rope 3. This take-up device 2 is provided with a gear 4 and it is directly in coöperation with this latter gear that I provide my retriever.

In carrying out my invention I provide a shaft 5 just below the take-up device 2, the same having mounted thereon a gear 6 which meshes with the gear 4 above referred to and connected with said gear 6 and rotatably mounted on the shaft 5 is a casing 7. The casing is constructed of two sections, one a cup like member 8 and the other a cone-shaped member 9, the same being secured together by means of a set screw or the like 10. Rotatably mounted on the shaft 5 is a rim like member 11, the same being in effect a spring casing for the coil spring 12 which has its one end secured to the inner face or the like of the member 11 and its inner end secured to the shaft 5.

The outer end of the shaft 5 is squared as shown at 13 and has an arm 14 mounted thereon to which is pivoted a pawl or latch member 15, the effective or engaging end of the latter is adapted for engagement with the teeth 16 arranged annularly on the outer face of the member 11. A coil spring 17 is interposed between the outer end of the latch or pawl 15 and the arm 14, as clearly shown in Fig. 2 of the drawing and the same normally retains said pawl or latch in its effective engaging position.

Pivotally supported on the rim of the member 11 is a pawl or latch member 18 the outer or engaging end thereof being adapted for engagement with the teeth 19 formed on the inner face of the section 8 of the member 7. A coil spring member 20 is interposed between the rim of the member 11 and the ineffective end of the pawl or latch 18, whereby to normally retain the latch or pawl member out of effective or engaging position.

Provided within the cone-shaped section 9 of the casing 7 is a governor or the like 21 of the usual or any preferred type having the spring operated stem or the like 22. This stem is arranged immediately adjacent the ineffective end of the pawl or latch 15 and is designed for the operation of the latter at certain times, whereby to release the engagement of said pawl or latch with the member 11.

In the operation of the car, it is often found that the trolley wire is not at all times at an equal distance with respect to the track and it is necessary for a slight adjustment which is made possible by the take-up device usually provided on trolley cars. As the reel on the slack take-up is revolved, the gear 4, will revolve and cause a slight movement of the gear 6 and the casing 7. Such a slight movement will not affect the operation of the device materially. However, should the trolley jump the wire it would immediately project into the air above the wire and cause the gear 6 and casing 11 to revolve rapidly. Such a rapid revolution will cause the governor members to be expanded and the trigger or stem 22 of said governor to be operated to release the pawl or latch member 15. Such an operation would place the coil spring 12 in operation and in view of the previous rapid revolution of the casing said coil spring with the casing or the like 11 would revolve and re-wind the trolley rope on the reel. In this connection it must also be noted that at the time the governor action is effected, the pawl or latch member 18 through the centrifugal action will be thrown into engagement with the teeth 19 and thus connection is had directly between the members 11 and 7 to enable the trolley rope to be rewound to a predetermined degree. When the trolley is thus automatically brought downwardly the same is readily placed in contact with the wire again by the conductor or other party in charge of the car. When the rope has been re-wound, the parts will always be in their normal positions as shown in Fig. 3 of the drawing, and the device is again ready for further operation.

In Fig. 4 of the drawing I have shown a slack take-up device and my improved retriever entirely incased within a housing 23 and secured to the reel of the trolley car. Such a casing or housing may or may not be used as desired.

From the foregoing description of the construction of my improved device, the operation thereof and the manner of applying the same to use will be readily understood and it will be seen that I have provided a simple, inexpensive and efficient means for carrying out the objects of the invention.

While I have particularly described the elements best adapted to perform the functions set forth, it is obvious that various changes in the form, proportion and in the minor details of construction may be resorted to, without departing from the spirit or sacrificing any of the principles of the invention.

Having thus described my invention, what I claim and desire to secure by Letters Patent, is:—

1. In a trolley retriever, a shaft, a casing rotatably mounted thereon, an additional casing within the aforesaid casing also rotatably mounted on said shaft, a coil spring inclosed within said last mentioned casing and secured to the latter at its one end and secured to the shaft at its opposite end, spring held means for normally holding the second mentioned casing under tension and against rotation, means for rotating said first mentioned casing at certain times, governor means operating therein for permitting the second mentioned casing to be rotated at certain times, and centrifugally operated means connecting said casings to rotate the same simultaneously upon the rotation of the second mentioned casing.

2. In a device of the class described, a shaft, a casing rotatably mounted thereon, means for rotating said casing at predetermined times, a coil spring within said casing secured at its one end to said shaft, a spring casing loosely mounted on the shaft and secured to the outer end of said spring, spring held means carried by said shaft to lock the spring casing normally against rotation, centrifugally operated means within said first mentioned casing for releasing said locking means upon the rapid rotation of said casing, and centrifugally operated means mounted on the spring casing and adapted for operation upon the rotation of said spring casing to carry the first mentioned casing therewith.

3. In a device of the class described, a shaft, a casing rotatably mounted thereon, means for rotating said casing at predetermined times, a coil spring within said casing secured at its one end to said shaft, a spring casing loosely mounted on the shaft and secured to the outer end of said spring, a spring held latch member carried by said shaft and engaging teeth carried on the spring casing to lock the spring casing normally against rotation, governor means within said first mentioned casing for releasing said locking means upon the rapid rotation of said casing, teeth carried within the first mentioned casing and a centrifugally actuated spring pawl mounted on the spring casing and adapted for engagement with said teeth upon the rotation of the spring casing whereby to rotate the first mentioned casing with the latter.

4. In a device of the class described, a shaft, a casing rotatably mounted thereon, means for rotating the same at certain times, a coil spring secured at its inner end on said shaft and arranged within said casing, a casing for said spring loosely mounted on the shaft and engaged with the outer end of the spring, a spring held latch member carried by the shaft, teeth carried by the spring casing for engagement with the latch to secure the casing against rotation in the normal position of the same, a centrifugal governor carried within the first mentioned casing adapted to release said latch upon the rapid rotation of said casing, whereby to permit the spring casing to be revolved, and means carried by said spring casing for engagement with portions of the first mentioned casing to revolve the latter therewith.

5. In a device of the class described, a shaft, a casing rotatably mounted thereon, means for rotating the same at certain times, a coil spring secured at its inner end on said shaft and means within said casing, a casing for said spring loosely mounted on the shaft and engaged with the outer end of the spring, a spring held latch member carried by the shaft, teeth carried by the spring casing for engagement with the latch to secure the casing against rotation in the normal position of the same, a centrifugal governor carried within the first mentioned casing adapted to release said latch upon the rapid rotation of said casing, whereby to permit the spring casing to be revolved, teeth carried on the inner periphery of the first mentioned casing and a spring held pawl carried by the spring casing and adapted to engage the teeth upon the rotation of the last mentioned casing, whereby to rotate said casings together.

In testimony whereof I affix my signature.

AUSTIN D. EBERLY.